US006788689B1

(12) United States Patent
Turner et al.

(10) Patent No.: US 6,788,689 B1
(45) Date of Patent: Sep. 7, 2004

(54) ROUTE SCHEDULING OF PACKET STREAMS TO ACHIEVE BOUNDED DELAY IN A PACKET SWITCHING SYSTEM

(75) Inventors: Jonathan S. Turner, St. Louis, MO (US); Michael B. Galles, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/520,683

(22) Filed: Mar. 7, 2000

(51) Int. Cl.[7] .......................... H04L 12/28; H04L 12/56

(52) U.S. Cl. .................... 370/395.4; 370/357; 370/412; 370/415; 370/416

(58) Field of Search ................................. 370/357, 359, 370/369, 375, 376, 380, 387, 412, 415, 416, 395.4, 395.41, 395.42, 400, 409, 413, 414

(56) References Cited

U.S. PATENT DOCUMENTS

| | | |
|---|---|---|
| 4,491,945 | 1/1985 | Turner |
| 4,494,230 | 1/1985 | Turner |
| 4,630,260 | 12/1986 | Toy et al. |
| 4,734,907 | 3/1988 | Turner |
| 4,785,446 * | 11/1988 | Dias et al. .................. 370/381 |
| 4,829,227 | 5/1989 | Turner |
| 4,849,968 | 7/1989 | Turner |
| 4,893,304 | 1/1990 | Giacopelli et al. |
| 4,901,309 | 2/1990 | Turner |
| 5,127,000 | 6/1992 | Henrion |
| 5,130,975 * | 7/1992 | Akata .......................... 370/416 |
| 5,164,939 * | 11/1992 | Shobatake .................. 370/416 |
| 5,173,897 | 12/1992 | Schrodi et al. |

(List continued on next page.)

OTHER PUBLICATIONS

Jonathan S. Turner, "Almost all k–Colorable Graphs are Easy to Color," Journal of Algorithms, Mar. 1988, 24 pages.

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS–96–07, Washington University, St. Louis, MO, 20 pages.

Turner et al., "System Architecture Document for Gigabit Switching Technology," Aug. 27, 1998, Ver. 3.5, ARL–94–11, Washington University, St. Louis, MO, 110 pages.

Dirkx et al., "Performance Evaluation of High Performance Switches on Parallel and Distributed Computers," Aug. 1997, Proceedings of the High–Performance Computing on the Information Superhighway, HPC–Asia '97, pp. 236–241.

Primary Examiner—Huy D. Vu
Assistant Examiner—Thomas E. Volper
(74) Attorney, Agent, or Firm—The Law Offices of Kirk D. Williams

(57) ABSTRACT

Connection distributors are used to route packets corresponding to multiple streams of packets through a packet switching system. During each time slot, one packet is typically sent from each packet stream. During the configuration of a packet stream, a time slot and primary route is determined for the packet stream. The primary route is a route through the packet switch which is non-blocking with other packet streams during the assigned time slot. During a common frame, a packet of each packet stream is sent out of a line card or packet interface to be routed through the packet switch over the designated primary route. During subsequent frames, packets are sent over different routes through the network (until all routes are used and then the cycle repeats). These routes are selected based on a deterministic method so as to maintain the non-blocking characteristic of the primary route selection.

12 Claims, 13 Drawing Sheets

U.S. PATENT DOCUMENTS

| | | | |
|---|---|---|---|
| 5,179,551 | | 1/1993 | Turner |
| 5,179,556 | | 1/1993 | Turner |
| 5,229,991 | | 7/1993 | Turner |
| 5,241,536 | * | 8/1993 | Grimble et al. ............. 370/398 |
| 5,253,251 | | 10/1993 | Aramaki |
| 5,260,935 | | 11/1993 | Turner |
| 5,309,430 | * | 5/1994 | Verhille et al. ............. 370/397 |
| 5,339,311 | | 8/1994 | Turner |
| 5,355,372 | * | 10/1994 | Sengupta et al. ........... 370/367 |
| 5,357,506 | * | 10/1994 | Sugawara .................... 370/392 |
| 5,402,415 | | 3/1995 | Turner |
| 5,572,521 | * | 11/1996 | Pauwels et al. ............. 370/412 |
| 5,577,035 | * | 11/1996 | Hayter et al. ............ 370/395.4 |
| 5,842,040 | | 11/1998 | Hughes et al. |
| 5,987,028 | * | 11/1999 | Yang et al. .................. 370/380 |
| 6,125,112 | * | 9/2000 | Koning et al. ............. 370/388 |
| 6,335,930 | * | 1/2002 | Lee ............................ 370/387 |

* cited by examiner

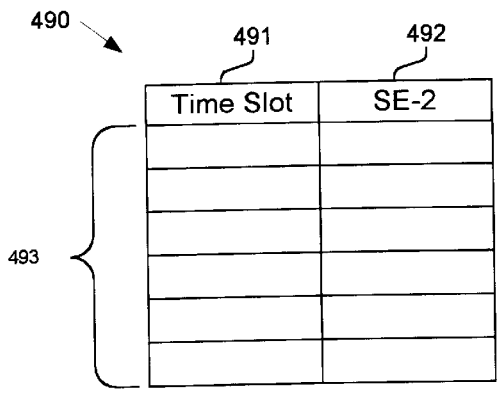

FIG. 4C

From Input X to Output Y:

Let $I_x(0)$, $I_x(1)$, and $I_x(2)$ be the links from the SE-1 through which packets from X reach the different SE-2's.

Let $I_y(0)$, $I_y(1)$, and $I_y(2)$ be the links to the SE-3 that connects to Y from the different SE-2s.

Select a timeslot "t" and a SE-2 "j" such that:
- the link from x is idle during time slot t;
- the link to y is idle during time slot t;
- the link $I_x(j)$ is idle during time slot t; and
- the link $I_y(j)$ is idle during time slot t.

Update routing data structure with the selected (t,j).

Route packets through the packet switch based the selected (t,j). At a common time, all packets for all connections use the route identified by (t,j). Subsequently, packets are sent over other possible routes in a predetermined order.

Note: if no such pair t,j satisfies the conditions, then either fail, or re-route existing connections so that all connections statisfy the conditions.

FIG. 4D

ROUTE SCHEDULING OF PACKET STREAMS TO ACHIEVE BOUNDED DELAY IN A PACKET SWITCHING SYSTEM

FIELD OF THE INVENTION

This invention relates to packet switching systems; and more particularly, the invention relates to the scheduling and routing of packets corresponding to multiple streams of packets through a packet switching system.

BACKGROUND OF THE INVENTION

The communications industry is rapidly changing to adjust to emerging technologies and ever increasing customer demand. This customer demand for new applications and increased performance of existing applications is driving communications network and system providers to employ systems having greater speed and capacity (i.e., greater bandwidth). In trying to achieve these goals, a common approach taken by many communications providers is to use packet switching technology. Packet technology typically allows multiple information types to be transmitted over the same transmission lines and using the same packet switching systems and devices.

As used herein, the term "packet" refers to generically addressable packets of all types, including fixed length cells and variable length packets. Moreover, these packets may contain one or more types of information, including, but not limited to, voice, data, video, and audio information. Furthermore, the term "system" is used generically herein to describe any number of components, packet switches, networks, computer and/or communication devices or mechanisms, or combinations thereof.

Consumers and designers of these systems typically desire increased performance at a reasonable price. A commonly used technique for helping to achieve this goal is for these systems to provide multiple paths between a source and a destination. Packets of information are then dynamically routed and distributed among these multiple paths. It is typically more cost-effective to provide multiple slower rate links or switching paths, than to provide a single higher rate path. Such designs also achieve other desired performance characteristics.

However, this approach can lead to network congestion, especially for certain types of traffic. Packet switching systems route all kinds of traffic, including point-to-point or circuit switched traffic. This traffic includes isochronous traffic that arrives at an input port and is routed to one or more output ports of the packet switching system. For example, a Synchronous Optical Network (SONET) OC-192 link might be terminated on an input port with numerous OC-3 and OC-1 streams of data being routed through the packet switching system. The uncoordinated routing of such traffic, and especially when multiple streams arriving at multiple inputs of a packet switch, can lead to some unbounded network congestion conditions. Needed are new methods and systems for routing such traffic to achieve bounded delay in the packet switching system.

SUMMARY OF THE INVENTION

Packet switches, systems apparatus and methods are disclosed for scheduling and routing packets through a packet switching system. In one embodiment, a packet switch has an input interface, an output interface and an interconnection network coupled to the first input and output interfaces. The input interface includes a packet route scheduler which schedules the forwarding of packets over a multiplicity of different paths in such a way as to limit contention for internal links in the interconnection network so as to ensure that packets pass through the interconnection network with bounded delay.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 4A–C is a block diagram illustrating the operation of the packet switching system illustrated in FIG. 2;

FIG. 4B illustrates an embodiment for determining time slots and frames;

FIG. 4C illustrates an embodiment of a data structure used in maintaining routes, FIG. 4D illustrates the operation of an embodiment for allocating non-blocking packet streams and routing packets according to the allocated packet streams;

DETAILED DESCRIPTION

Methods and apparatus are disclosed for scheduling and routing of packets through a packet switching system so as to achieve bounded delay. Such methods and apparatus are not limited to a single packet switching environment. Rather, the architecture and functionality of the invention as taught herein and would be understood by one skilled in the art is extensible to an unlimited number of packet switching environments and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, inter alia, systems, integrated circuit chips, methods, and computer-readable medium containing instructions. The embodiments described hereinafter embody various aspects and configurations within the scope and spirit of the invention.

Figure 1A:
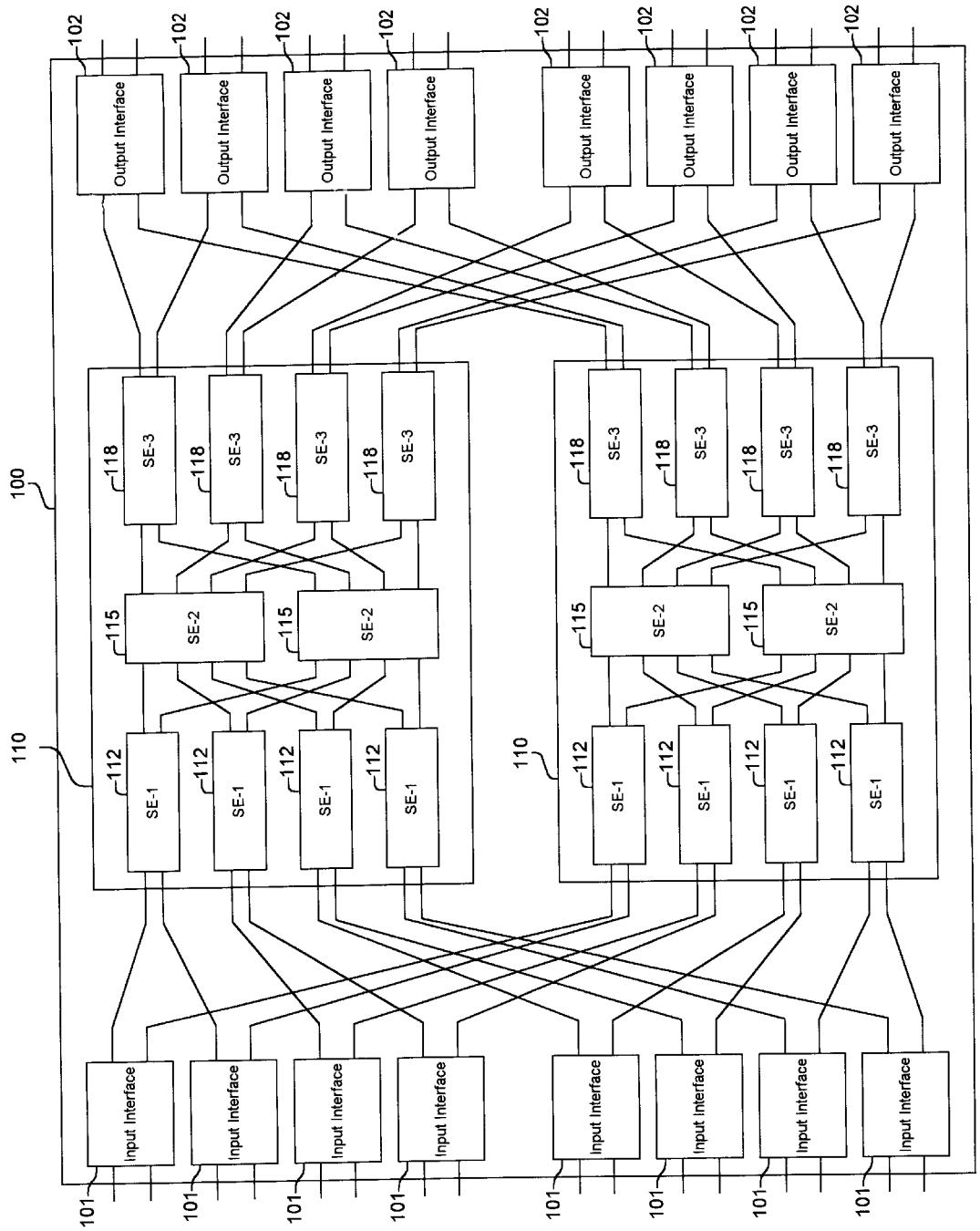
FIGS. 1A–C are block diagrams of a few of many possible packet switching systems.
Figure 1B:
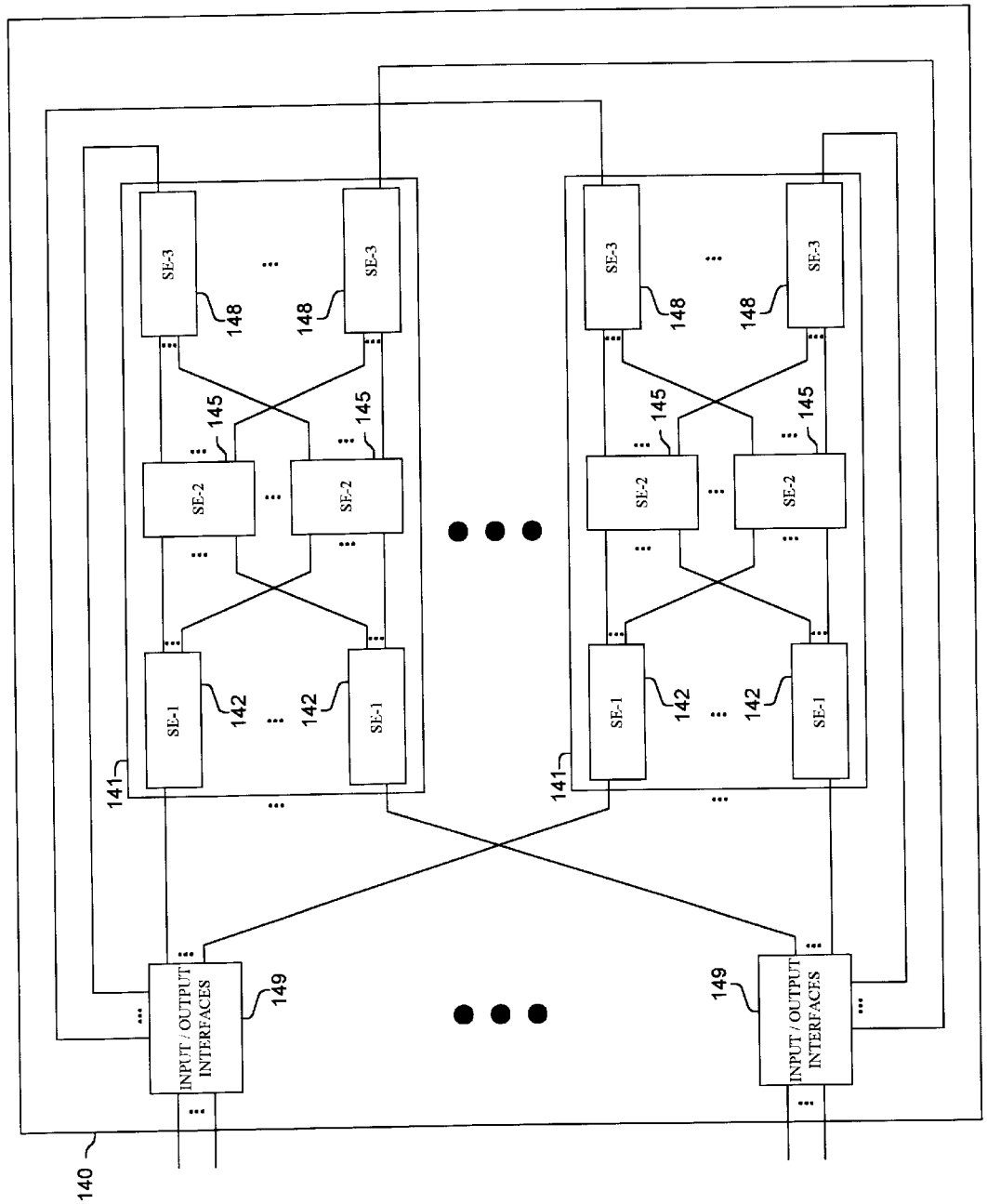
Figure 1C:
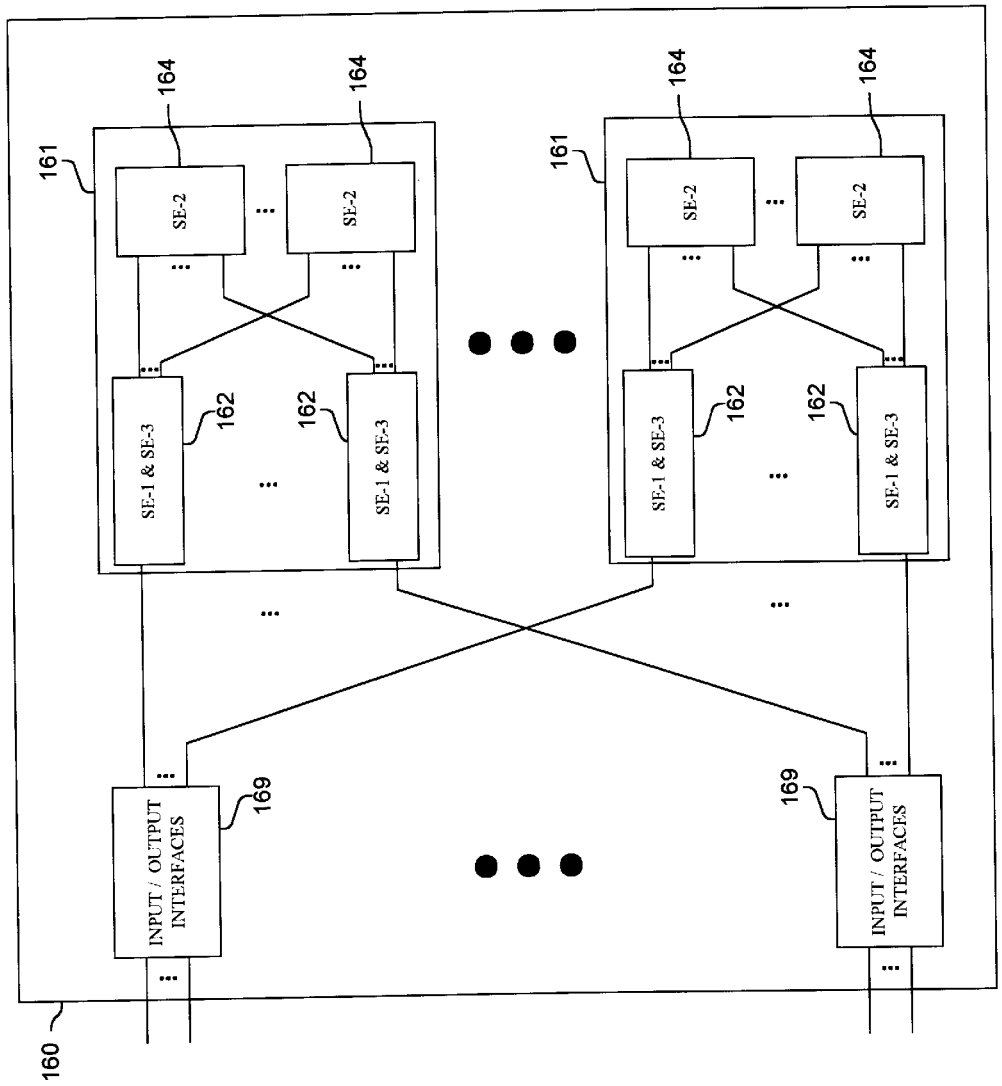

Turning now to the figures, FIGS. 1A–C and their discussion herein are intended to provide a description of various exemplary packet switching systems. FIGS. 1A–C illustrate different forms of packet switching systems. FIG. 1A illustrates an exemplary packet switch 100 having sixteen inputs and sixteen outputs, and using two eight by eight interconnection networks 110 (or planes of switching elements). FIG. 1B illustrates an exemplary packet switch 140 having multiple interconnection networks 141. FIG. 1C illustrates an exemplary folded packet switch 160 having multiple interconnection networks 161. Of course, the present invention is not limited to these illustrated operating environments, and packet switches in which the invention may be practiced may have more or less elements.

Turning now to FIG. 1A, illustrated is an exemplary embodiment of a packet switch 100. Packet switch 100 comprises multiple input interfaces 101 which perform the coordinated scheduling and route selection of packets. Input interfaces 101 are interconnected over multiple links to an interconnection networks 110, which are interconnected over multiple links to output interfaces 102. Interconnection networks 110 as shown comprise multiple switch elements SE-1 112, SE-2 115, and SE-3 118 also interconnected by multiple links. Input and output interfaces 101 and 102 may connect to other systems (not shown) which provide the data to route through the packet switch 100.

Turning now to FIG. 1B, illustrated is another exemplary operating environment and embodiment of a packet switch 140 of the invention. Packet switch 140 comprises multiple input and output interfaces 149 interconnected over multiple links to interconnection networks 141, which are interconnected over multiple links returning to input and output interfaces 149. Packet switch input and output interfaces 149 include packet route schedulers for the coordinated scheduling and routing of packets through a packet switching system so as to achieve bounded delay. Interconnection networks 141 as shown comprise multiple switch elements SE-1 142, SE-2 145, and SE-3 148 also interconnected by multiple links. Interfaces 149 may connect via bi-directional links to other systems (not shown) which provide the data to route through the packet switch 140.

Turning now to FIG. 1C, illustrated is another exemplary operating environment and embodiment of a packet switch 160 of the invention. As shown, packet switch 160 has a folded network topology. Packet switch 160 comprises multiple input and output interfaces 169 interconnected over multiple links to interconnection networks 161, which are interconnected over multiple links returning to interfaces 169. Packet switch input and output interfaces 169 include packet route schedulers for the coordinated scheduling and routing of packets through a packet switching system so as to achieve bounded delay. Interconnection networks 161 as shown comprise multiple switch elements SE-1 & SE-3 162 and SE-2 164 also interconnected by multiple links. Interfaces 169 may connect via bi-directional links to other systems (not shown) which provide the data to route through the packet switch 160.

Many different embodiments for coordinated scheduling and routing of packets to achieve bounded delay through a packet switching system are possible in keeping within the scope and spirit of the invention. This coordinated scheduling and routing of packets is especially beneficial to certain types of traffic, such as isochronous traffic between an input and an output port of a packet switch. This type of traffic may be continuous for a long duration. In such a case, the packet switching system performs a switching function similar to that of a circuit switch. Of course, the invention is not limited to certain types of traffic that can be scheduled and switched.

In one embodiment, distinct packet streams are assigned to distinct time slots in a periodic transmission frame and packet streams assigned to the same time slot are also assigned nonblocking routes through the interconnection network (in one embodiment, a "time slot" is the time required for an input interface of a packet switch to send one packet; a "transmission frame" is a set of T consecutive time slots where T is an integer parameter of a particular system; a set of routes is "nonblocking" if no two routes in the set traverse the same link in the interconnection network). These routes are sometimes referred to as the "primary routes" for their corresponding packet streams.

In systems that provide multiple routes between input and output ports, the routes used by packet streams can be rotated through the set of available routes in successive transmission frames, so as to balance the overall traffic load in the system as a whole. This is done in such a way so that in every transmission frame and every time slot, the set of routes used in that combination of frame and time slot is non-blocking. This rotation of routes used by different packet streams is advantageous in systems that handle both packet streams requiring bounded delay and bursty data traffic that can tolerate variable delays and which has less predictable traffic characteristics. In such systems, the routing of bursty data traffic cannot be strictly coordinated, but must respond to the unpredictable arrival processes of the traffic. Such traffic can be carried through the interconnection network at a lower priority level than the packet streams that are scheduled to receive bounded delay. The rotation of routes used by the scheduled packet streams so as to balance the traffic load they place on the interconnection network allows the bursty data traffic to obtain better performance than it would otherwise.

In order to assign time slots and primary routes for each of the packet streams, one or more data structures indicating previously allocated primary routes and time slots are maintained within a packet switch or somewhere within the packet switching system. These data structures could be located centrally or at each input interface or line card. Alternatively, the initial assignment could be done manually by an operator. Via some input method, such as a received configuration packet or a request via an operations terminal, the packet switching system can automatically determine and assign the time slots and non-blocking primary routes. These configuration requests can be received initially, before assigning the time slots and primary routes, or incrementally. It is possible that a configuration request could not be fulfilled because the previously fulfilled requests produce a configuration where no non-blocking primary route is available. In such a case, the configuration request could be denied, or the packet switching system could reassign time slots and primary routes in an attempt to accommodate all packet stream requests.

Once a time slot and primary route have been assigned, a line card and/or input interface of a packet switch maintains a data structure indicating such assignment. Further, the line card and/or input interface either maintains or receives indications of the current frame and time slot. In an embodiment, a line card will terminate a multiplexed external signal and create a stream of packets for each channel of the received signal. During each time slot, the line card sends a single packet to an input interface of the packet switch. Depending on the embodiment, the line card could designate the particular route for the particular packet to take, or the receiving packet interface could add such information. Once again, the particular route is a function of the assigned primary route of the packet stream, the current frame number, and the particular deterministic distribution method employed by the embodiment (e.g., round robin across all or a subset of possible routes through the packet switch).

As an example embodiment, consider a packet switching system in which some of the line cards terminate OC-192 SONET links and the system is required to route OC-1 streams from these OC-192 links through the packet switching system as packet streams with bounded delay, so as to emulate the characteristics of an OC-1 circuit. Let F be the time required for a line card to receive enough data from the link to fill 192 packets and let T be the number of packets that the line card can send to the interconnection network in this time (T will typically be greater than or equal to 192). Then each of the transmission frames used to coordinate the scheduling of packets through the interconnection network will contain T time slots. If the interconnection network provides R distinct routes between each (input line card, output line card) pair, successive transmission frames are numbered from 0 to R-1 (these numbers are repeated cyclically) and these numbers are used to guide the rotation of routes used by the packet streams carrying the different OC-1 circuits. In this example, each OC-1 is assigned a time slot and a primary route. Data received from each OC-1 is collected to form a complete packet and held at the input line card until the assigned time slot, and is then sent by the input line card to the interconnection network. Packets sent by an input line card during frames numbered 0 are sent through the interconnection network using the assigned primary routes. Packets sent through the interconnection network in subsequent frames are rotated through the set of all available routes, so as to balance the traffic load as evenly as possible.

Figure 2:
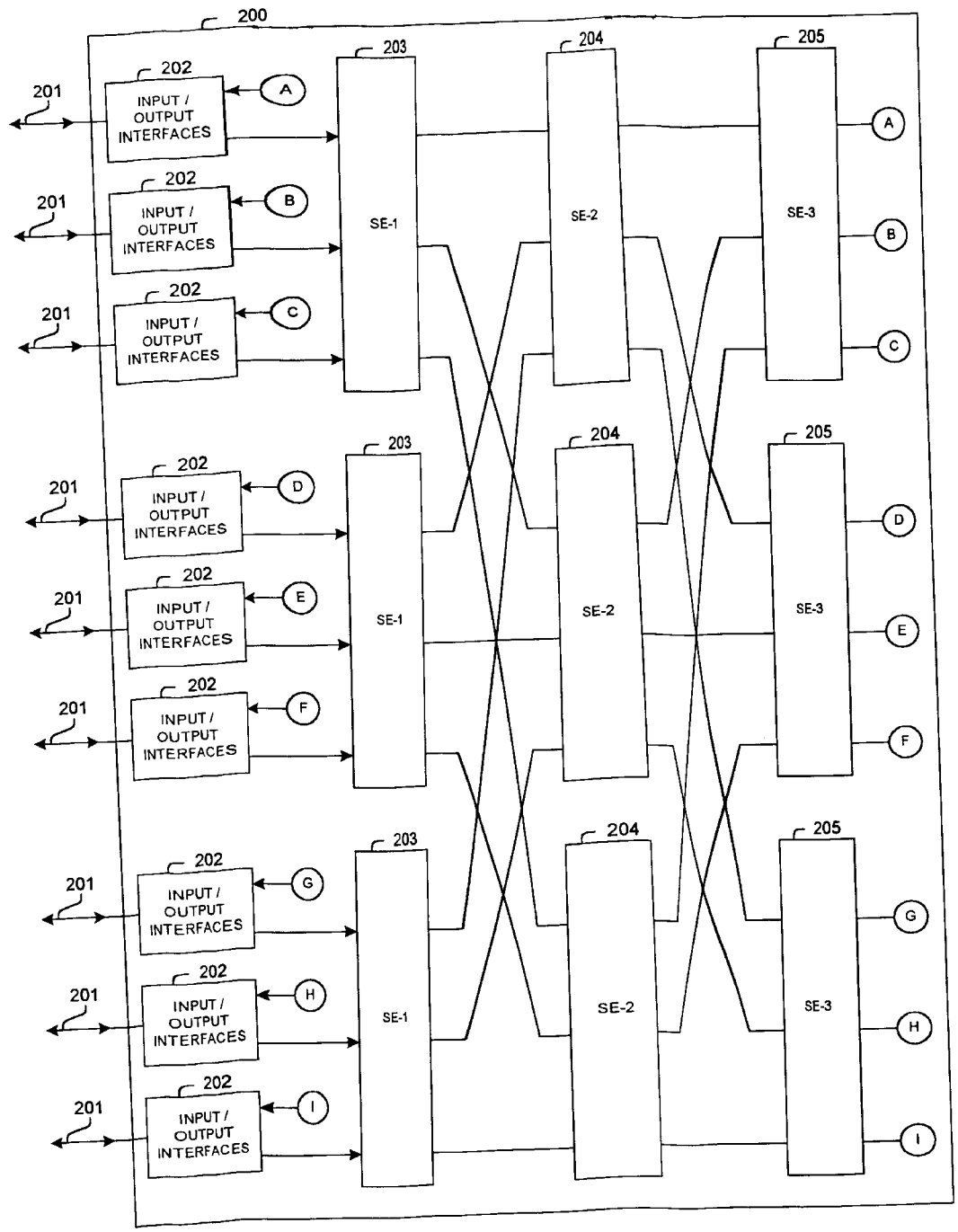
FIG. 2 is a block diagram of a packet switching system.

Turning now to FIG. 2, illustrated is a packet switch 200 which coordinates scheduling and routing of packets corresponding to multiple streams of packets. External signals 201 are terminated by the input and output interfaces 202 of packet switch 200. Packet switch 200 includes a three-stage switching fabric, comprising switch elements SE-1 203 at the first stage, switch elements SE-2 204 at the second stage, and switch elements SE-3 205 at the third stage. The output of switch elements SE-3 205 are linked to input and output interfaces 202 as illustrated. The operation of packet switch 200 is further described in relation to FIGS. 3A–C, 4A–D, and 5.

Figure 3A:
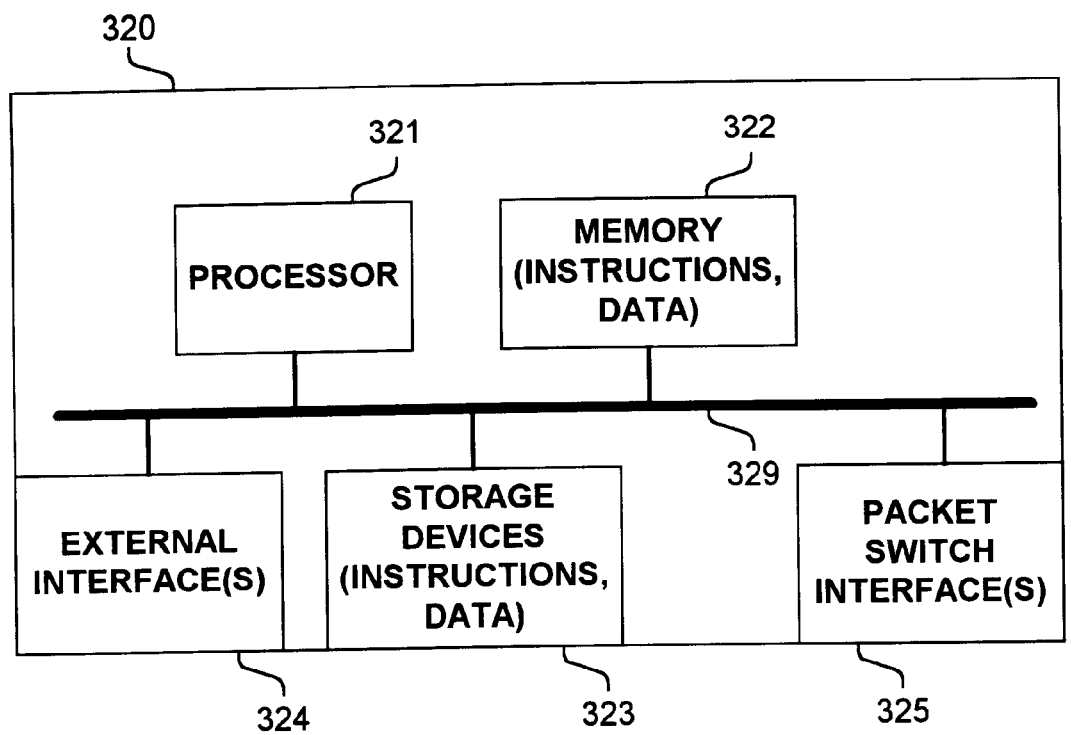
FIGS. 3A–C are block diagrams illustrating exemplary embodiments of packet switching system elements for the coordinated scheduling and routing of packets corresponding to multiple streams of packets.
Figure 3B:
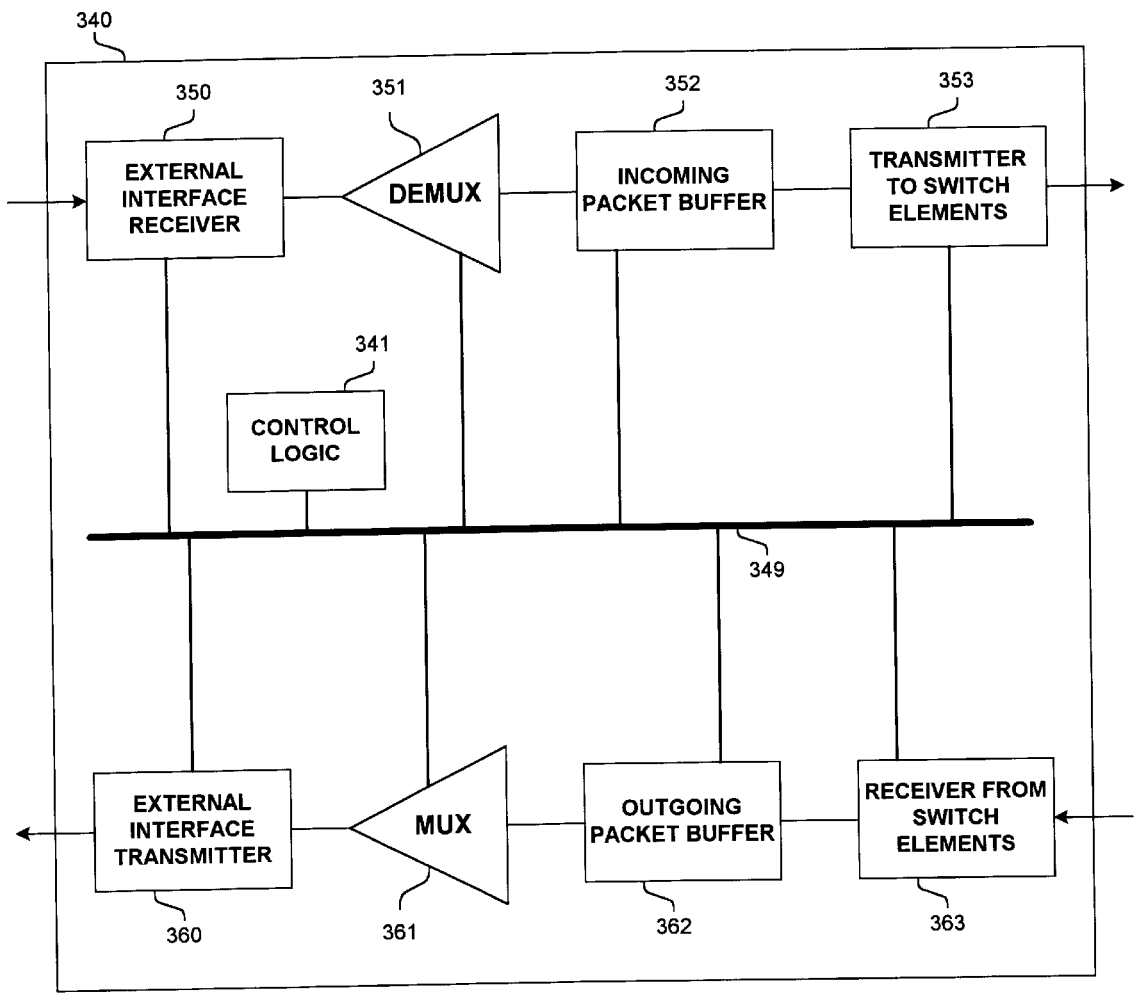
Figure 3C:
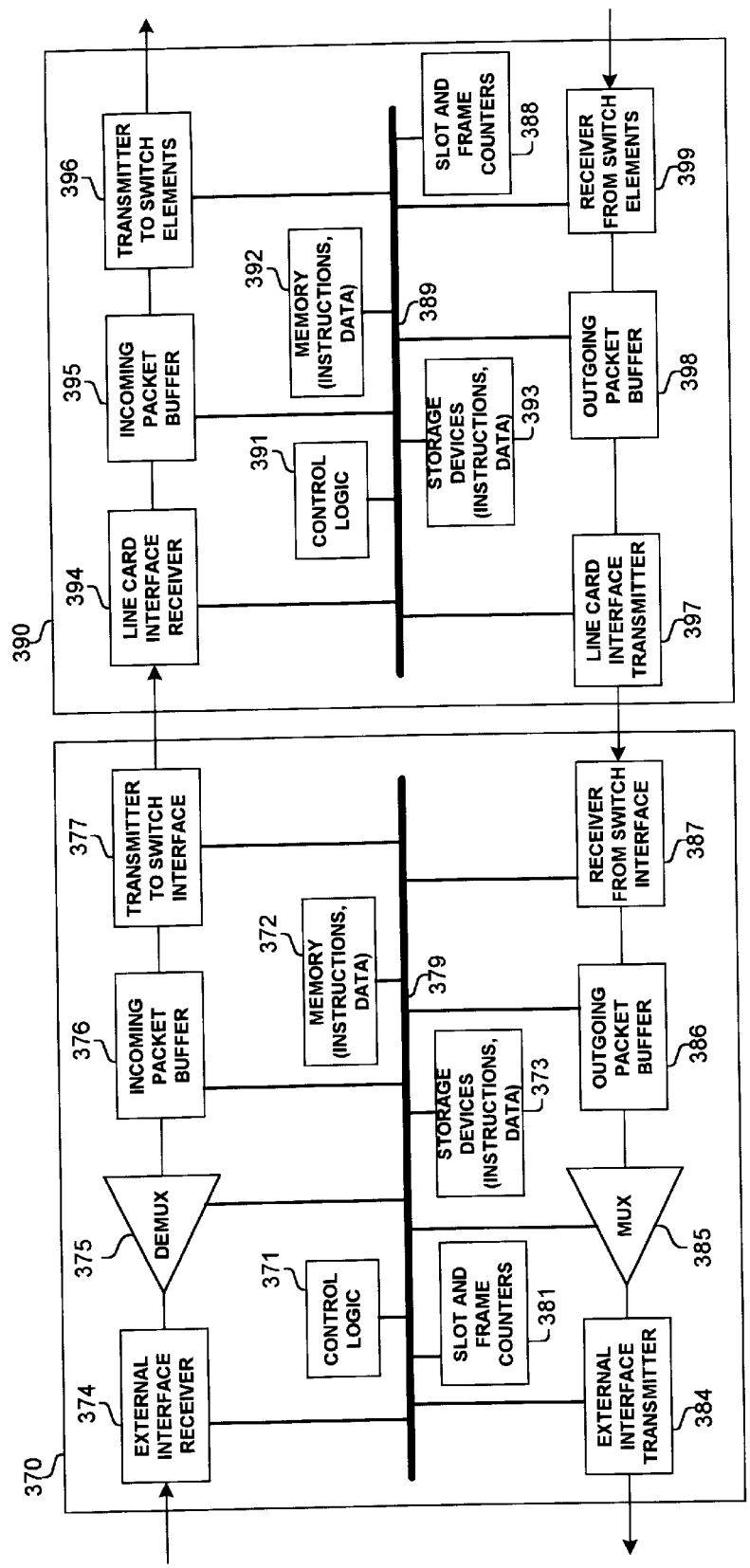

Turning first to FIGS. 3A–C, illustrated are three of numerous possible embodiments of the input and output interfaces 202. Turning to FIG. 3A, embodiment 320 comprises a processor 321, memory 322, storage devices 323, and one or more external interface(s) 324, and one or more packet switch interface(s) 325, and one or more internal communications mechanisms 329 (shown as a bus for illustrative purposes). External interface(s) 324 receive and send external signals 201 (FIG. 2) to one or more communications devices or networks (e.g., one or more networks, including, but not limited to the Internet, intranets, private or public telephone, cellular, wireless, satellite, cable, local area, metropolitan area and/or wide area networks). Memory 322 is one type of computer-readable medium, and typically comprises random access memory (RAM), read only memory (ROM), integrated circuits, and/or other memory components. Memory 322 typically stores computer-executable instructions to be executed by processor 321 and/or data which is manipulated by processor 321 for implementing functionality described herein. Storage devices 323 are another type of computer-readable medium, and typically comprise disk drives, diskettes, networked services, tape drives, and other storage devices. Storage devices 323 typically store computer-executable instructions to be executed by processor 321 and/or data which is manipulated by processor 321 for implementing functionality described herein.

As used herein, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Turning to FIG. 3B, embodiment 340 of input and output interfaces 202 (FIG. 2) comprises control logic 341 implementing functionality described herein. Control logic 341, which includes memory for storage of data and instructions, is connected to other components of embodiment 340 via one or more internal communications mechanisms 349 (shown as a bus for illustrative purposes). External interface receiver 350 receives external signals 201, separates the signals into channels using demultiplexor 351 into multiple streams of packets which are temporarily stored in incoming packet buffer 352. At the appropriate time slot, a packet is sent to the appropriate switch element SE-1 203 (FIG. 2) via transmitter to switch elements 353. Packets are received from switch elements SE-3 205 at the receiver from switch elements 363 and placed in the outgoing packet buffer 362. Multiplexor 361 extracts the packets and creates a multiplexed signal which is transmitted via external interface transmitter 360.

Turning now to FIG. 3C, illustrated is an embodiment of input and output interfaces 202 (FIG. 2) which is broken into two components, a line card 370 and a switch interface 390.

The embodiment of line card 370 illustrated in FIG. 3C includes control logic 371 implementing functionality described herein. Control logic 371 is connected to other components of line card 370 via one or more internal communications mechanisms 379 (shown as a bus for illustrative purposes). In one embodiment, control logic 371 includes memory for storing instructions and data. Line card 370 also includes optional additional memory 372 and storage devices 373. External interface receiver 374 receives external signals 201 (FIG. 2), separates the signals into channels using demultiplexor 375 into multiple streams of packets which are temporarily stored in incoming packet buffer 376. In an embodiment, control logic 371, referencing a data structure within control logic 371 or memory 372, places a header designating a route for the packet to take through the packet switch 200. Embodiment 370 includes slot and frame counters 381 for maintaining the current slot and frame number, while the control logic of other embodiments maintains these values. At the appropriate time slot, a packet is sent to switch interface 390 via transmitter to switch interface 377. Packets are received from switch interface 390 at the receiver from switch interface 387 and placed in the outgoing packet buffer 386. Multiplexor 385 extracts the packets and creates a multiplexed signal which is transmitted via external interface transmitter 384.

The embodiment of input/output interface 390 illustrated in FIG. 3C includes control logic 391 implementing functionality described herein. Control logic 391 is connected to other components of switch interface 390 via one or more internal communications mechanisms 389 (shown as a bus for illustrative purposes). In one embodiment, control logic 391 includes memory for storing instructions and data.

Switch interface 390 also includes optional additional memory 392 and storage devices 393. Line card receiver 394 receives packets from line card 370 temporarily stores the packets in incoming packet buffer 395. If the packet does not have a route designated, then control logic 391, referencing a data structure within control logic 391 or memory 392, places a header designating a route for the packet to take through the packet switch 200. Embodiment 390 includes slot and frame counters 388 for maintaining the current slot and frame number, while the control logic of other embodiments maintains these values. In some embodiments, counters 388 are used to maintain a current time for the component 390 or current global time across the packet switching system. At the appropriate time slot, a packet is sent to an appropriate switch element SE-1 203 via transmitter to switch elements 396. Packets are received from switch elements SE-3 205 at the receiver from switch elements 399 and placed in the outgoing packet buffer 398. Line card interface transmitter 397 then forwards these to line card 370.

Figure 4A:
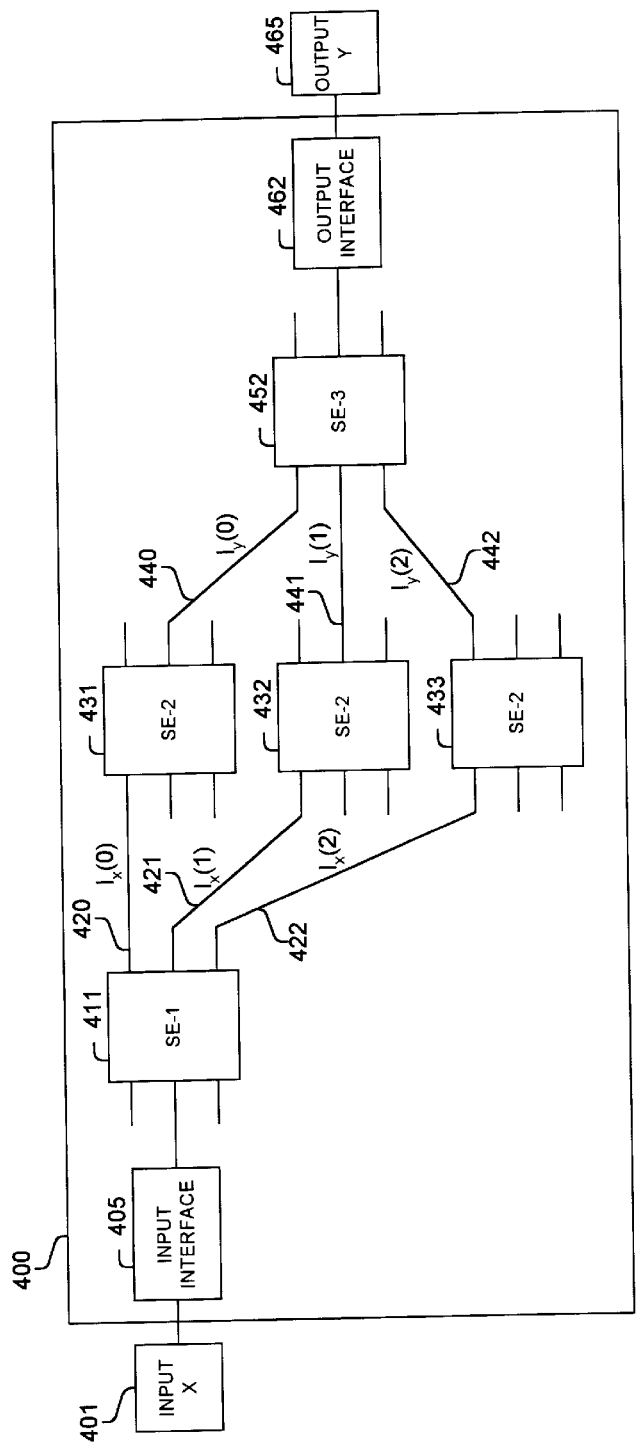

FIGS. 4A–D and 5 will now be used to illustrate the operation of an embodiment of the invention to determine a time slot and primary route for a packet stream between input x 401 and output y 465 (FIG. 4A). First, FIG. 4A presents an annotated partial view of packet switch 400 (such as that of packet switch 200 shown in FIG. 2). Shown components of packet switch 400 are input interface 405, switch element SE-1 411 connected to switch elements SE-2 431-433 via links 420–422, and switch element SE-3 452 connected to switch elements SE-2 431–433 via links 440–442, and output interface 462.

Figure 4B:
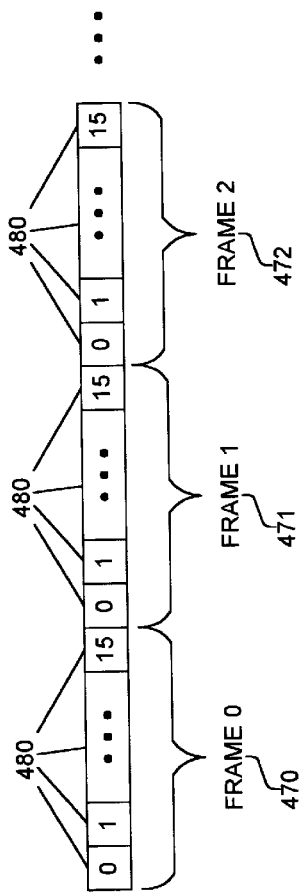

There are three possible routes through packet switch 400 between input x 401 and output y 465. These three routes correspond to the three frames for sending packets, which are shown in FIG. 4B as frames 0–2 470–472. For illustrative purposes, packet switch 400 will have sixteen time slots 480 (as shown in FIG. 4B). For packet switch 400, each of the different routes between a given input line card and output line card can be identified by which switch element SE-2 431–433 the route passes through. Thus, as illustrated by data structure 490 (FIG. 4C), a packet stream can be assigned a time slot 491 and a switch element SE-2 492. An embodiment of data structure 490 stores a (time slot 491, SE-2 492) pairing 493 for each packet stream.

A description 499 for the selection of a time slot and route for a particular packet stream from input x 401 to output y 465 is illustrated in FIG. 4D, to which we now turn and will describe with reference to FIG. 4A. First, we define $I_x(0)$, $I_x(1)$, $I_x(2)$ to be the links from the SE-1 through which packets from input x reach the different SE2s (i.e., links 420–422). Next, we define $I_y(0)$, $I_y(1)$, $I_y(2)$ to be the links from the SE-3 that connects to output y from the different SE 2's (i.e., links 440–442). Next, a time slot "t" and a SE-2 "j" are selected such that during frame 0:

(1) the link from x is idle during time slot t,
(2) the link to y is idle during time slot t;
(3) the link to $I_x(j)$ is idle during time slot t; and
(4) the link $I_y(j)$ is idle during time slot t.

Data structure 490 (FIG. 4C) is then updated with the selected time slot and route. Note, if there is no pair (t,j) that satisfies the conditions, then the packet stream cannot be routed as requested, and the request will be rejected; alternatively, some or all of the existing packet streams can be assigned to different time slots and primary routes to allow the subject packet stream to be accommodated. At frame 0, all packets are routed via their determined primary route j.

Figure 5:
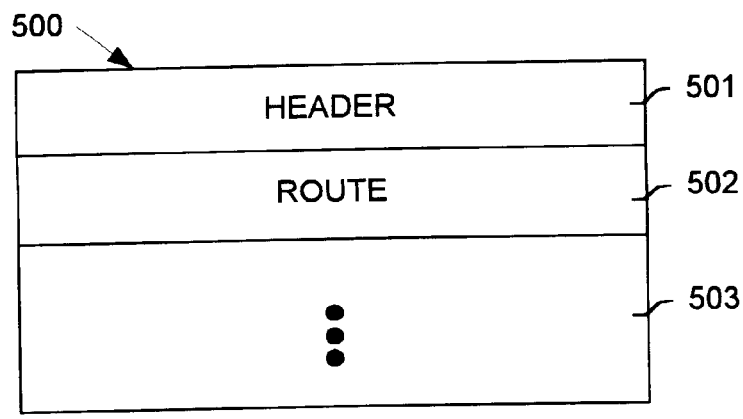
FIG. 5 is a block diagram of an exemplary packet format for identifying to the switching elements the particular route for a packet to take.

Referring to FIG. 5, illustrated is an exemplary packet format 500 containing a header field 501, route field 502, and other control information and data field 503. At time slot t, the routing information required to route through SE-2 j is inserted in field 502 which is used by packet switch 400 in routing the packet. For frames other than frame 0, packets for each packet stream are routed over other possible routes, with the particular other route identified via some predetermined order or deterministic manner (e.g., a round robin over possible routes) as determined by control logic within the packet switch or packet switching system.

An alternative embodiment of the invention uses a different method for determining the routes taken by packets through the interconnection network. In this embodiment, routes are selected in a distributed fashion by the input interfaces and the switch elements that make up the interconnection network. For example, in a system like the one shown in FIG. 1B, the input interfaces select which plane to send a particular packet to and the SE1s determine which SE2 to send a packet to.

Figure 6:
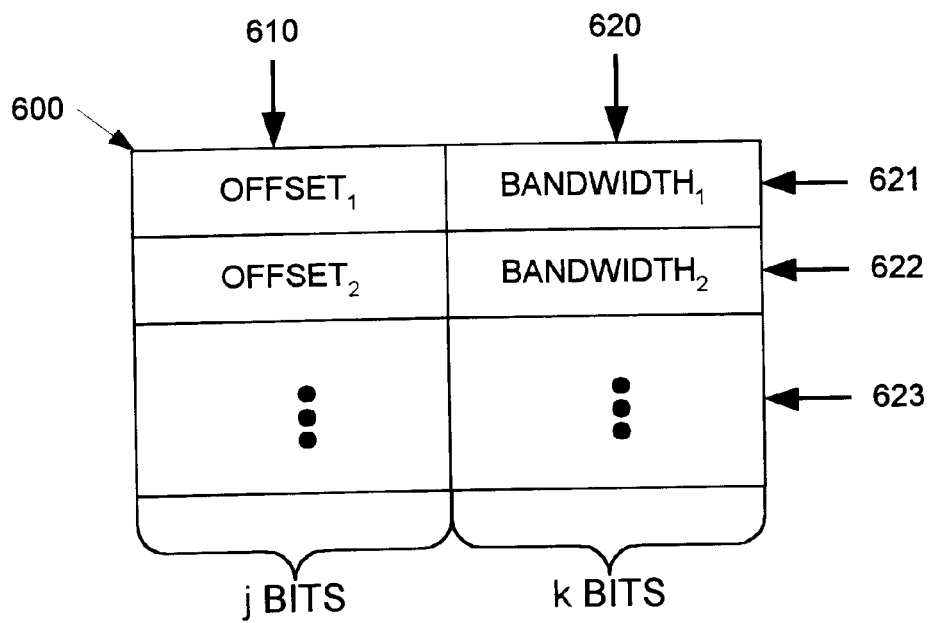
FIG. 6 is a block diagram of a routing data structure.

In the alternative embodiment, each component of the system that participates in the selection of routes used by different packets maintains a routing data structure that contains two pieces of information for each output of the interconnection network that it forwards packets to. One of these is called the "offset" and the other is called the "bandwidth". One embodiment of such a routing data structure 600, is illustrated in FIG. 6. This embodiment is just a table in which there is a row for every output of the packet switch which the given component forwards packets to, and in each row there is an offset and bandwidth value. The offset and bandwidth values in a given row are used to determine part of the route to be taken by packets going to the output interface associated with that row.

An example of the alternative embodiment is now described with reference to FIG. 1B. Consider a packet switching system with the structure illustrated in FIG. 1B and let P be the number of planes 141 in the system and let S be the number of SE2s 145 in each plane. Each input/output interface and each SE1 in the system contains an instance of routing data structure 600. In the input interfaces, the offset values specify one of the P planes and the bandwidth value in a given row of the table specifies the amount of bandwidth reserved for packets forwarded from the particular input interface to the output associated with that row. In the subsequent description, the bandwidth is expressed in multiples of the bandwidth of the interconnection network's internal links.

In the alternative embodiment, input line cards transmit packets in assigned timeslots as was discussed previously, but the assignment of routes to packets is done by the input interfaces and SE1s. Consider the (offset, bandwidth) values for a particular output interface Y of the system. Let f denote the offset and b denote the bandwidth. In this case, the input interface will transmit packets to output y using planes numbered f, f+1, . . . , f+b−1. The particular plane selected for a packet depends on the time at which the input interface receives the packet from the input line card. This is done in such a way to ensure that if b packets for destination Y arrive during b successive time slots, that each such packet will be routed through a different plane.

The operation of the route assignment mechanism in the SE I is similar to that for the input interfaces. In an SE1, the offset identifies one of the links from that SE1 to an SE2, and the bandwidth value for a particular output interface Y represents the total bandwidth used by packets passing through that SE1 and going to output interface Y. If the (offset, bandwidth) pair for output Y is (f, b), then packets to output Y are routed through the links numbered f, f+1, . . . , f+b−1 connecting that SE1 to SE2s. The particular link used by a packet is determined by the time at which it arrives at the SE1.

Figure 7:
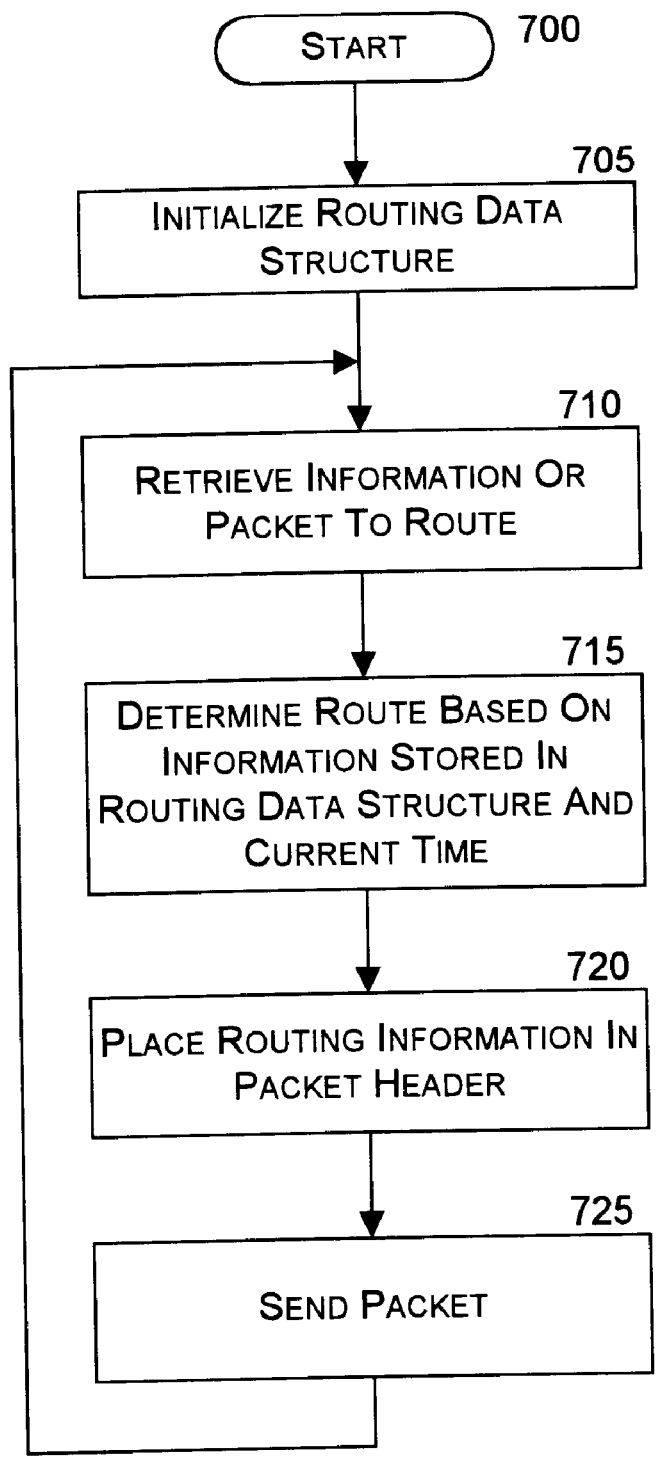
FIG. 7 illustrates the operation of an embodiment for determining a particular route for a packet of a packet stream at a particular time and routing the packet over the determined route.

The alternative embodiment is now described in more general terms. FIG. 7 illustrates an embodiment for using the information maintained in routing data structure 600 (FIG. 6) to determine a route, or the next portion of the route, for a particular packet to use at a particular time. Processing begins at step 700, and proceeds to step 710 where the routing data structure 600 is initialized (e.g., provisioned) with offset and bandwidth values 610 and 620, usually for at least each destination to which packets are forwarded by the particular component. In an embodiment, a centralized controller sends control packets to each component participating in the selection of routes of the packet switching system containing values to populate data structure 600. The offset and bandwidth values 610 and 620, along with a value of time, are used to determine a route by which to transfer packet. This information is used to route packets in such a way that the contention for internal links is minimized, allowing bounded delay to be achieved.

In one embodiment, each offset value represents one of the possible routes, or the next portion of the route, (e.g., switching fabrics, paths, etc.) through the packet switching system. In a packet switching system having thirty-two planes, an offset value may range between zero and thirty-one, and thus, can be represented in five bits.

In one embodiment, the bandwidth value represents a percentage or a fraction of the total traffic being sent to a particular destination, which is being sent to the particular destination by the component maintaining data structure 600. For example, if five bits are used to maintain each bandwidth value, then a value of fifteen or sixteen corresponds to the component sending roughly fifty percent of the packet stream's traffic to corresponding output port.

In step 710, a packet to be routed is retrieved from a queue or other data structure. In step 715, the route, or the next portion of the route, for this retrieved packet is determined based on the information (e.g., offset and bandwidth values 610 and 620) stored in the routing data structure 600 for the intended destination of the packet and a value of a local or global time, such as the current time or time the packet was received at the component. One or more formulas or methods, such as those described hereinafter, are used to determine the actual route based on these values.

After the route has been determined in step 715, then, optionally, routing information based on the determined route is placed in the header of the packet in step 720, and the packet is sent to the destination over the determined route in step 725.

Figure 8:
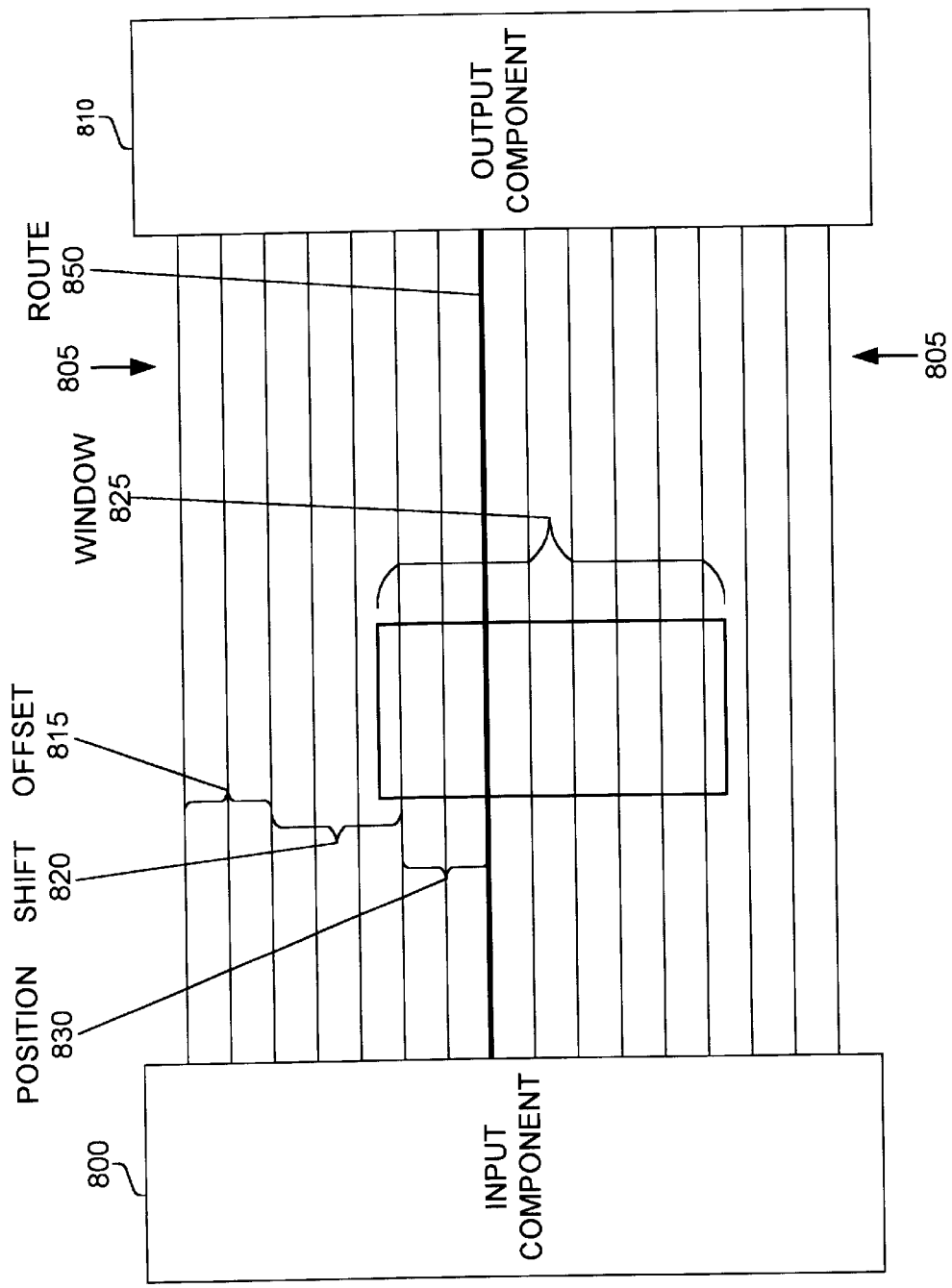
FIG. 8 is a block diagram illustrating one embodiment for determining a particular route for a packet belonging to a packet stream to use at a particular time.

FIGS. 8 and 9 illustrate another embodiment of a process for determining a route from a set of paths over which to send a particular packet destined for a particular output. One embodiment groups the possible paths leading to a destination into "windows" of paths over which packets to a particular output may be routed. The size of a window for a particular output corresponds to the bandwidth used by the given component for traffic to the particular output. A set of non-overlapping windows is determined for each of the components sending traffic to the particular output. Thus, each of the components sending to a particular output may send packets over a path which is not available for any other of the sending components.

FIGS. 8 and 9 illustrate an exemplary embodiment for determining such a window and its position among the possible paths, and a particular path within the determined window for a packet belonging to the packet stream to be routed at a particular time. Referring to FIG. 8, a packet can be sent from input component 800 to output component 810 over the multiple paths 805 as shown. Using a value corresponding to the bandwidth required for a packet stream, a window 825 of possible paths to select from at a particular time is determined. Window 825, as shown for this example, encompasses one-half the possible paths between input component 800 and output component 810. Therefore, in this particular example, the value of bandwidth 620 (FIG. 6) for this packet stream stored in data structure 600 corresponds to fifty percent of the total traffic being sent to the destination.

An offset value 815 and a window shift value 820 determine the location of window 825. Each window 825 for all packet streams is shifted by an equal window shift value 820. Therefore, when the window shift value 820 is zero, then the position of each window 825 is determined by its offset value 815. The offset values 815 for the different components sending to the particular outputs are provisioned in a manner such that the windows 825 corresponding to that particular output are non-overlapping, and thus, minimize congestion induced by these packet streams. Additionally, this provisioning process may consider the traffic destined for other outputs in determining the offset values 815, so as to reduce, or even minimize, congestion induced by all, or a subset of, the traffic. In one embodiment, offset values 815 are stored in offset fields 610 of data structure 600 (FIG. 6).

The position 830 corresponds a route 850 selected from the paths 805 within window 825 at a particular time. By varying the values of position 830 and shift 820 over time, the windows 825 and position 830 within windows 825 changes, and thus traffic is distributed across multiple paths 805 in a manner to minimize congestion.

Figure 9A:
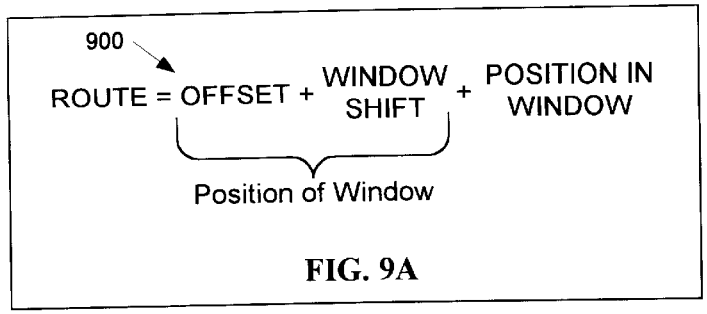
FIGS. 9A–C illustrate different values used in determining a particular route for a packet belonging to a packet stream to use at a particular time.
Figure 9B:
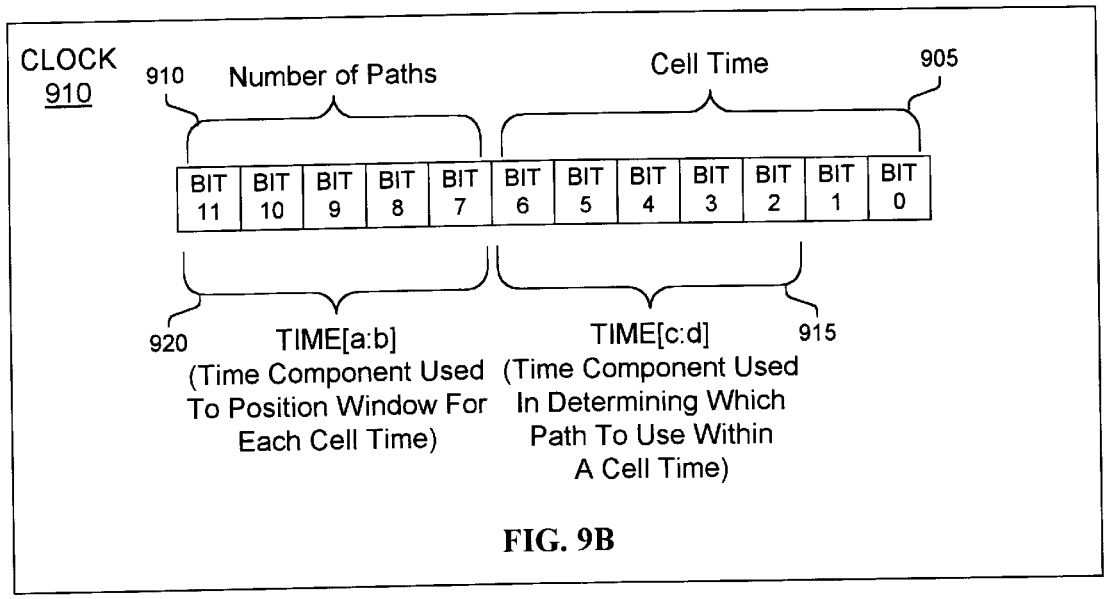
Figure 9C:
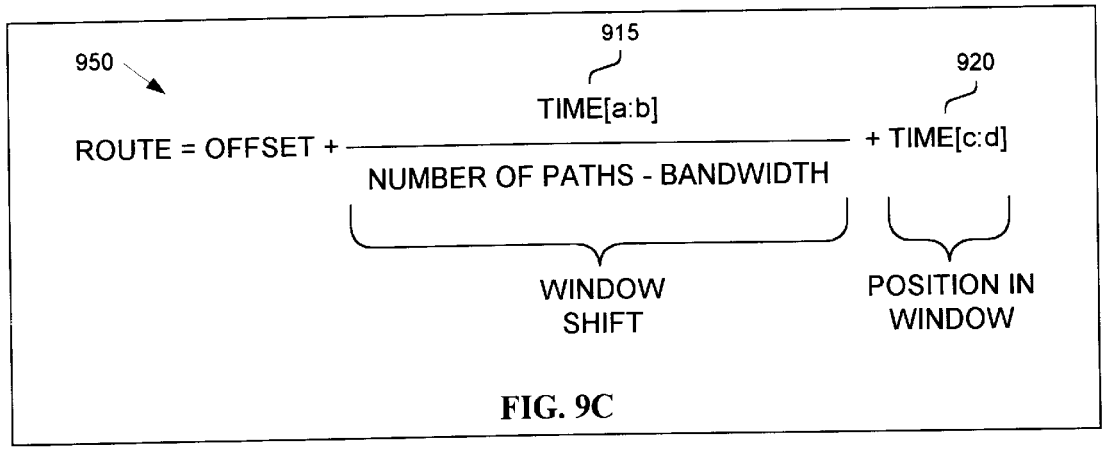

FIGS. 9A–9C illustrate various relationships for determining a particular route from the possible paths, or a next portion of a path, over which to send a packet. Equation 900 illustrates a relationship used in one embodiment where the route to use for a particular packet is determined based on a position of a provisioned window and a position within the window. The position of the window may be determined by a window offset value and a window shift value.

FIGS. 9B–C illustrates a process used in one embodiment for shifting the values of the position in window and the window shift based on a particular value of time. One embodiment of a packet switching system, or other system using packet streams, maintains a clock 910 using a number of bits to represent a particular value of time. In one embodiment illustrated in FIG. 9B, eleven bits are used. In one embodiment, a cell (e.g., packet) can be sent across a path in 256 clock ticks, which corresponds to the low order 7 bits of the clock. One embodiment uses two subsets of these bits, time[a:b] 915 and time[c:d] 920, of clock 910 to vary the values of the position in window and the window shift. The range for time[a:b] 915 may be selected based on the number of total paths available. In the example shown in FIG. 9B, thirty two paths are available which is represented by 5 bits and indicated by number of paths 910.

Using time[a:b] 915 and time[c:d] 920, a relationship 950 illustrated in FIG. 9C may be used to determine a particular route, or a next portion of the path, over which to route a packet for a particular time value of clock 910. The offset value may be provisioned as previously discussed herein. A window shift value may be determined based on time[a:b] 915 divided by the total number of paths minus the bandwidth of the packet stream. A position within the window may be determined based on time[c:d] 920. A data structure, such as that illustrated in FIG. 6, may be used to maintain the offset and bandwidth values used in relationship 950. Using relationship 950 or another of the techniques described herein, properly provisioned routing data structures may decrease network congestion while distributing their traffic across the possible paths to their destination.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A method comprising:

initializing a routing data structure containing routing information for one or more destinations; and determining for a packet a route from a plurality of possible routes leading to a destination for the packet at a particular time based on a value of a clock and at least one value maintained in the routing data structure, the value of the clock including a plurality of bits;

wherein the clock value includes a first subset of bits and a second subset of bits, and the plurality of possible routes includes a window of routes including less than all of the plurality of possible routes; and wherein said determining for the packet the route includes identifying a position of the window of routes, which includes determining a window shift value based on the first subset of bits and determining the position of the route within the window of routes, based on the second subset of bits.

2. The method of claim 1, wherein the routing data structure includes a route offset value:

wherein the route is determined based on an offset from the value of the clock, the offset identified by the route offset value.

3. The method of claim 2, wherein the routing data structure includes an indication of a bandwidth requirement; wherein the route is determined based on an offset from the value of the clock, the offset identified by the route offset value.

4. The method of claim 1, wherein the routing data structure includes an indication of a bandwidth requirement.

5. A method for scheduling sending packets in a packet switch the packet switch comprising:

a clock including a first subset of bits and a second subset of bits, and an interconnection network including a first stage switch element, one or more intermediate stages of switch elements, a final stage switch element and a plurality of links, the interconnection network including a plurality of non-conflicting paths between the first stage switch element over at least some of the plurality of links and through at least some of said one or more intermediate stages of switch elements to the final stage switch element, the method comprising:

identifying a particular window including less than all of non-conflicting paths, wherein a particular one of said less than all of the plurality of non-conflicting paths in the particular window is identified for the first stage switch element based on a window shift value and a position within a particular window, the window shift value being determined using the first subset of bits and the position within the window being determined based on the second subset of bits.

6. The method of claim 5, comprising incrementing the clock value so as to send successive packets from the first stage switch element to the final stare switch element over different paths within the particular window.

7. The method of claim 5, wherein a position of the particular window is further identified by based on an offset value indicating a relative starting position of the particular window.

8. A method for scheduling sending packets over an interconnection network, the interconnection network including a plurality of first stage switch elements, one or more intermediate stages of switch elements, and a final stage switch element, the interconnection network including a plurality of links connecting the plurality of first stage switch elements with each switch element of a next stage of said one or more intermediate stages of switch elements and connecting the final stage switch element with each switch element of a last stare of said one or more intermediate stages of switch elements, the interconnection network including a plurality of non-conflicting paths between the plurality of first stage switch elements over the plurality of links and through said one or more intermediate stages of switch elements to the final stage switch element, the method comprising:

for each particular first stage switch element of the plurality of first stage switch elements:

identifying a corresponding portion of a total bandwidth of packets being sent from the plurality of first stage switch elements to the final stage switch element; and identifying a particular window of said paths corresponding to the corresponding portion of the total bandwidth of packets, the particular window of said paths not including a same path included in a window of paths corresponding to a different one of the plurality of first stage switch elements, sending successive packets from one of the first stage switch elements over different paths within the particular window of said paths corresponding to said one of the first stage switch elements;

wherein the particular window of said each particular first stage switch element is identified by an offset value corresponding to said each particular first stage switch element and a window shift value common to all of the plurality of first stage switch elements; and wherein the particular one of said paths is identified for each particular first stage switch based on a clock value, the clock value including a first subset of bits and a second set bits, and the window shift value is determined using the first subset of bits and the position within the window is determined based on the second subset of bits.

9. A packet switch comprising:

an interconnection network including:

a of first stage switch element;

one or more intermediate stages of switch elements;

a final stage switch element; and a plurality of links, the interconnection network including a plurality of paths between the first stage switch element over at least some of the plurality of links and through at least some of said one or more intermediate stages of switch elements to the final stage switch element; and a clock including a first subset of bits and a second set bits;

wherein the packet switch is configured to send packets over the interconnection network between the first stage switch element to the final stage switch element;

wherein a particular one of said plurality of paths is identified for the first stage switch element based on a window shift value and a position within a particular window, the window shift value being determined using the first subset of bits and the position within the window being determined based on the second subset of bits.

10. The packet switch of claim 9, wherein the packet switch is configured to increment the clock so as to send successive packets from the first stage switch element over different paths within the particular window.

11. The packet switch of claim 9, wherein a position of the particular window is further identified based on an offset value indicating a relative starting position of the particular window.

12. A packet switch comprising:

an interconnection network including: a plurality of first stare switch elements;

one or more intermediate stages of switch elements, a final stage switch element; and a plurality of links connecting the plurality of first stare switch elements with each switch element of a next stage of said one or more intermediate stages of switch elements and connecting the final stare switch element with each switch element of a last stage of said one or more intermediate stages of switch elements, the interconnection network including a plurality of non-conflicting paths between the plurality of first stage switch elements over the plurality of links and through said one or more intermediate stages of switch elements to the final stage switch element;

wherein the packet switch is configured to schedule sending packets over the interconnection network, said scheduling for each particular first stage switch element of the plurality of first stage switch elements including;

identifying a corresponding portion of a total bandwidth of packets being sent from the plurality of first stage switch elements to the final stage switch element; and identifying a particular window of said paths corresponding to the corresponding portion of the total bandwidth of packets, the Particular widow of said paths not including a same path included in a window of paths corresponding to a different one of the plurality of first stage switch elements;

wherein the packet switch is configured to schedule sending successive packets from one of the first stage switch elements over different paths within the particular window of said paths corresponding to said one of the first stage switch elements, the particular window of said each particular first stage switch element is identified by an offset value corresponding to said each particular first stage switch element and a window shift value common to all of the plurality of first stage switch elements; and wherein the particular one of said paths is identified for each particular first stage switch based on a clock value, the clock value includes a first subset of bits and a second set bits, and the window shift value is determined using the first subset of bits and the position within the window is determined based on the second subset of bits.

* * * * *

UNITED STATES PATENT AND TRADEMARK OFFICE
CERTIFICATE OF CORRECTION

PATENT NO.     : 6,788,689 B1
DATED          : September 7, 2004
INVENTOR(S)    : Turner et al.

It is certified that error appears in the above-identified patent and that said Letters Patent is hereby corrected as shown below:

Column 2,
Line 21, replace "packets," with -- packets; --.
Line 27, replace "routes," with -- routes; --.

Column 7,
Line 55, replace "t," with -- t; --.

Column 8,
Line 63, replace "SE I" with -- SE1 --.

Column 11,
Line 36, replace "routes," with -- routes --.
Line 39, replace "value:" with -- value; --.
Line 51, replace "switch" with -- switch, --.

Column 12,
Line 6, replace "stare" with -- stage --.
Line 9, replace "identified by" with -- identified --.
Line 21, replace "stare" with -- stage --.
Line 39, replace "elements," with -- elements; --.
Line 59, replace "a of first" with -- a first --.

Column 13,
Line 7, replace "clement" with -- element --.
Lines 24, 27 and 30, replace "stare" with -- stage --.
Line 25, replace "elements," with -- elements; --.

UNITED STATES PATENT AND TRADEMARK OFFICE
CERTIFICATE OF CORRECTION

PATENT NO. : 6,788,689 B1
DATED : September 7, 2004
INVENTOR(S) : Turner et al.

It is certified that error appears in the above-identified patent and that said Letters Patent is hereby corrected as shown below:

Column 14,
Line 6, replace "including;" with -- including: --.
Line 13, replace "the Particular" with -- the particular --.

Signed and Sealed this

Thirteenth Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,788,689 B1
DATED : September 7, 2004
INVENTOR(S) : Turner et al.

It is certified that error appears in the above-identified patent and that said Letters Patent is hereby corrected as shown below:

Column 2,
Line 26, replace "system," with -- system; --.
Line 21, replace "packets," with -- packets; --.
Line 27, replace "routes," with -- routes; --.

Column 7,
Line 55, replace "t," with -- t; --.

Column 8,
Line 63, replace "SE I" with -- SE1 --.

Column 11,
Line 36, replace "routes," with -- routes --.
Line 39, replace "value:" with -- value; --.
Line 51, replace "switch" with -- switch, --.

Column 12,
Line 6, replace "stare" with -- stage --.
Line 9, replace "identified by" with -- identified --.
Line 21, replace "stare" with -- stage --.
Line 39, replace "elements," with -- elements; --.
Line 59, replace "a of first" with -- a first --.

Column 13,
Line 7, replace "clement" with -- element --.
Lines 24, 27 and 30, replace "stare" with -- stage --.
Line 25, replace "elements," with -- elements; --.

UNITED STATES PATENT AND TRADEMARK OFFICE
CERTIFICATE OF CORRECTION

PATENT NO. : 6,788,689 B1
DATED : September 7, 2004
INVENTOR(S) : Turner et al.

It is certified that error appears in the above-identified patent and that said Letters Patent is hereby corrected as shown below:

<u>Column 14,</u>
Line 6, replace "including;" with -- including: --.
Line 13, replace "the Particular" with -- the particular --.

This certificate supersedes Certificate of Correction issued September 13, 2005.

Signed and Sealed this

Sixth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,788,689 B1
DATED : September 7, 2004
INVENTOR(S) : Turner et al.

It is certified that error appears in the above-identified patent and that said Letters Patent is hereby corrected as shown below:

Column 2,
Line 16, replace "system," with -- system; --.
Line 21, replace "packets," with -- packets; --.
Line 27, replace "routes," with -- routes; --.

Column 7,
Line 55, replace "t," with -- t; --.

Column 8,
Line 63, replace "SE I" with -- SE1 --.

Column 11,
Line 36, replace "routes," with -- routes --.
Line 39, replace "value:" with -- value; --.
Line 51, replace "switch" with -- switch, --.

Column 12,
Line 6, replace "stare" with -- stage --.
Line 9, replace "identified by" with -- identified --.
Line 21, replace "stare" with -- stage --.
Line 39, replace "elements," with -- elements; --.
Line 59, replace "a of first" with -- a first --.

Column 13,
Line 7, replace "clement" with -- element --.
Lines 24, 27 and 30, replace "stare" with -- stage --.
Line 25, replace "elements," with -- elements; --.

UNITED STATES PATENT AND TRADEMARK OFFICE
CERTIFICATE OF CORRECTION

PATENT NO.    : 6,788,689 B1
DATED         : September 7, 2004
INVENTOR(S)   : Turner et al.

It is certified that error appears in the above-identified patent and that said Letters Patent is hereby corrected as shown below:

Column 14,
Line 6, replace "including;" with -- including: --.
Line 13, replace "the Particular" with -- the particular --.

This certificate supersedes Certificate of Correction issued September 13, 2005 and December 6, 2005.

Signed and Sealed this

Thirty-first Day of January, 2006

JON W. DUDAS
*Director of the United States Patent and Trademark Office*